United States Patent [19]

Denzinger et al.

[11] Patent Number: 5,747,619
[45] Date of Patent: May 5, 1998

US005747619A

[54] WATER-SOLUBLE, CARBOXYL-CONTAINING COPOLYMERS, THE PREPARATION THEREOF AND THE USE THEREOF AS SCALE INHIBITOR

[75] Inventors: Walter Denzinger, Speyer; Heinrich Hartmann, Limburgerhof; Birgit Potthoff-Karl, Ludwigshafen; Karl-Heinz Buechner, Altlussheim; Marc Heider, Neustadt; Hans-Juergen Raubenheimer, Ketsch, all of Germany

[73] Assignee: BASF Aktiengesellschaft, Ludwigshafen, Germany

[21] Appl. No.: 596,141

[22] PCT Filed: Aug. 16, 1994

[86] PCT No.: PCT/EP94/02721

§ 371 Date: Feb. 20, 1996

§ 102(e) Date: Feb. 20, 1996

[87] PCT Pub. No.: WO95/06074

PCT Pub. Date: Mar. 2, 1995

[30] Foreign Application Priority Data

Aug. 27, 1993 [DE] Germany .......................... 43 28 817.0

[51] Int. Cl.[6] .................. C08F 220/02; C08F 220/06; C08F 216/12; C08F 218/04; C08F 212/06
[52] U.S. Cl. .................. 526/318.5; 526/332; 526/319; 526/347; 526/348; 210/701
[58] Field of Search ............... 526/318.5, 318.41, 526/318.45, 319, 332, 347, 348; 210/701

[56] References Cited

U.S. PATENT DOCUMENTS 3,756,257  9/1973  Rice et al. .
4,872,995  10/1989  Chen et al. .............................. 210/699
5,086,142  2/1992  Fock et al. .............................. 526/318

FOREIGN PATENT DOCUMENTS

| 0009169 | 4/1980 | European Pat. Off. . |
| 0260386 | 3/1988 | European Pat. Off. . |
| 0261589 | 3/1988 | European Pat. Off. . |
| 0276464 | 8/1988 | European Pat. Off. . |
| 64000109 | 1/1989 | Japan . |
| 1454657 | 11/1976 | United Kingdom . |

OTHER PUBLICATIONS

Abstract of L.

*Primary Examiner*—Joseph L. Schofer
*Assistant Examiner*—Wu C. Cheng
*Attorney, Agent, or Firm*—Oblon, Spivak, McClelland, Maier & Neustadt, P.C.

[57] ABSTRACT

Water-soluble copolymerizates are disclosed containing carboxyl groups, and also containing the following components incorporated by polymerization: (a) 30 to 80 mol % monoethylenically unsaturated $C_3$–$C_8$ carboxylic acids, anhydrides thereof and/or water-soluble salts thereof; (b) 10 to 50 mol % $C_2$–$C_8$ olefines, styrene, alkyl styrene, $C_1$–$C_{10}$ alkyl vinyl ethers and/or vinyl esters of saturated $C_1$–$C_{10}$ monocarboxylic acids; and (c) 0.01 to 20 mol % vinyl ethers and/or allyl ethers of alkoxylated $C_1$–$C_{30}$ alcohols. The copolymerizates in question have a K-value of at least 8 (determined after H. Fikentscher). Also disclosed are methods of producing the water-soluble copolymerizates by copolymerization of the monomers in the presence of radical-forming polymerization initiators, and the use of the polymerizates as scale inhibitors.

4 Claims, No Drawings

WATER-SOLUBLE, CARBOXYL-CONTAINING COPOLYMERS, THE PREPARATION THEREOF AND THE USE THEREOF AS SCALE INHIBITOR

The invention relates to water-soluble, carboxyl-containing copolymers, to a process for the preparation of the copolymers by polymerization of monoethylenically unsaturated carboxylic acids and other copolymerizable monoethylenically unsaturated monomers in the presence of free-radical polymerization initiators and to the use of the copolymers as scale inhibitor.

U.S. Pat. No. 3,756,257 discloses the use of homopolymers of acrylic acid as scale inhibitor. GB-A-1 411 063 discloses the use of hydrolyzed polymaleic anhydrides in water treatment. Suitable polymers are prepared, for example, by polymerizing maleic anhydride in xylene using benzoyl peroxide as initiator and subsequently hydrolyzing the polymaleic anhydride obtained in this way.

EP-B-0 009 169 discloses a process for the suspension copolymerization of maleic anhydride and $C_6$–$C_{10}$-alkenes in excess alkenes as suspending medium. In this case, poly-$C_1$–$C_{20}$-alkyl vinyl ethers are used as dispersants.

EP-A-0 260 386 discloses the preparation of olefin-maleic anhydride copolymers in powder form by free-radical polymerization of olefins and maleic anhydride in aromatic solvents in the presence of copolymers of ethylene and vinyl acetate or polystyrene as dispersant.

GB-A-1 454 657 and EP-A-0 261 589 disclose the use of hydrolyzed copolymers of maleic anhydride as scale inhibitor.

According to EP-A-0 276 464, water-soluble copolymers of maleic acid are prepared by copolymerization of maleic anhydride with a maximum of up to 20% by weight of another monoethylenically unsaturated monomer which is copolymerizable therewith in an aromatic hydrocarbon in the presence of peroxy esters as polymerization initiators. The copolymerization can, according to the statements in the application, also be carried out in the presence of protective colloids. After removal of the solvent and hydrolysis of the anhydride groups, the copolymers are used as water-treatment agents for preventing deposition of scale and separation out of water hardness in water-conveying systems.

As disclosed in the abovementioned references, aggregation and deposition of polymers on parts of the polymerization apparatus during the precipitation polymerization is avoided or substantially prevented on use of protective colloids. However, in this case, the copolymers result in more or less coarse form and can often be dissolved completely in water in the form of the salts only with difficulty. In most cases, cloudy salt solutions of the copolymers are obtained. However, when such cloudy solutions are metered with the aid of metering pumps, blockages in the metering pumps occur. Another problem in the use of copolymers of, for example, maleic anhydride and olefins is that aqueous solutions of the copolymers foam greatly on use as scale inhibitor.

It is an object of the present invention to provide novel substances which, for example when used as scale inhibitor, form clear solutions even on dissolving in seawater and which virtually do not foam in seawater desalination by the multistage flash evaporation process.

We have found that this object is achieved by water-soluble, carboxyl-containing copolymers when they comprise (a) 30 to 80 mol % of monoethylenically unsaturated $C_3$–$C_8$-carboxylic acids, their anhydrides and/or their water-soluble salts, (b) 10 to 50 mol % of $C_2$–$C_8$-olefins, styrene, alkylstyrenes, $C_1$–$C_{10}$-alkyl vinyl ethers and/or vinyl esters of saturated $C_1$–$C_{10}$-monocarboxylic acids and (c) 0.01 to 20 mol % of vinyl ethers and/or allyl ethers of alkoxylated $C_1$–$C_{30}$-alcohols as copolymerized units and have a K value of at least 8 (determined by the method of H. Fikentscher on 1% by weight aqueous solutions of the sodium salts of the copolymers at 25° C. and pH 7.5).

The object is additionally achieved by a process for preparing water-soluble copolymers by copolymerization of (a) 30 to 80 mol % of monoethylenically unsaturated $C_3$–$C_8$-carboxylic acids, their anhydrides and/or water-soluble salts, (b) 10 to 50 mol % of $C_2$–$C_8$-olefins, styrene, alkylstyrenes, $C_1$–$C_{10}$-alkyl vinyl ethers and/or vinyl esters of saturated $C_1$–$C_{10}$-monocarboxylic acids and (c) 0.01 to 20 mol % of vinyl ethers and/or allyl ethers of alkoxylated $C_1$–$C_{30}$-alcohols in the presence of free-radical polymerization initiators.

The invention additionally relates to the use of the copolymers described above as scale inhibitor.

The water-soluble copolymers comprise as monomers of group (a) from 30 to 80, preferably 40 to 75, mol % of monoethylenically unsaturated $C_3$–$C_8$-carboxylic acids, their anhydrides and/or water-soluble salts as copolymerized units. Suitable carboxylic acids are, for example, acrylic acid, methacrylic acid, dimethylacrylic acid, ethacrylic acid, allylacetic acid, vinylacetic acid, crotonic acid, maleic acid, fumaric acid, citraconic acid, methylenemalonic acid, mesaconic acid and itaconic acid. Where said unsaturated carboxylic acids can form anhydrides, these anhydrides are also suitable as monomers of groups (a), eg. maleic anhydride, itaconic anhydride and methacrylic anhydride. The monoethylenically unsaturated carboxylic acids can also be used in the copolymerization in the form of their water-soluble salts. Suitable examples are the ammonium, alkali metal and alkaline earth metal salts of these acids. They are obtained by partial or complete neutralization of the unsaturated carboxylic acids with bases. Examples of suitable bases are ammonia, amines such as $C_1$–$C_{30}$-alkylamines, alkanolamines such as ethanolamine, diethanolamine or triethanolamine, morpholine, and sodium hydroxide solution, potassium hydroxide solution, sodium carbonate, potassium carbonate, sodium bicarbonate, potassium bicarbonate, calcium hydroxide and barium hydroxide. Ammonia or sodium hydroxide solution is preferably used to neutralize the carboxylic acids. The monomers of group (a) can be used in the copolymerization either alone or in a mixture. Apart from the partially neutralized carboxylic acids, suitable examples are mixtures of maleic anhydride and acrylic acid, mixtures of acrylic acid and itaconic anhydride, mixtures of maleic anhydride and itaconic anhydride and mixtures of maleic anhydride, acrylic acid and methacrylic acid. These mixtures can contain the constituents in any desired ratios. Maleic anhydride and mixtures of maleic anhydride and acrylic acid are preferred.

The copolymers comprise as monomers of group (b) from 10 to 50, preferably 15 to 49, mol % of $C_2$–$C_8$-olefins, styrene, alkylstyrenes, $C_1$–$C_{10}$-alkyl vinyl ethers and/or vinyl esters of saturated $C_1$–$C_{10}$-monocarboxylic acids as copolymerized units. Examples of suitable olefins are ethylene, propylene, n-butene, isobutene, 1-pentene, 1-hexene, 1-heptene and diisobutene. Apart from said α-olefins, the corresponding isomers can also be used in the polymerization. Suitable alkylstyrenes contain 1 to 3 carbon atoms in the alkyl group, eg. α-methylstyrene. The alkyl vinyl ethers contain 1 to 10 carbon atoms in the alkyl group, eg. vinyl methyl ether, vinyl ethyl ether, vinyl n-propyl ether, vinyl isopropyl ether, vinyl n-butyl ether, vinyl isobutyl ether, vinyl tert-butyl ether, vinyl hexyl ether and vinyl 2-ethylhexyl ether.

Examples of vinyl esters of saturated $C_1$-$C_{10}$-monocarboxylic acids are vinyl formate, vinyl acetate, vinyl propionate, vinyl butyrate and vinyl pivalate. The monomers of group (b) can be used in the copolymerization alone or in a mixture, eg. mixtures of styrene and isobutene or styrene and vinyl acetate or mixtures of isobutene and diisobutene. The copolymers preferably contain isobutene as copolymerized units.

The copolymers comprise as monomers of group (c) from 0.01 to 20, preferably 0.1 to 15, mol % of vinyl ethers and/or allyl ethers of alkoxylated $C_1$-$C_{30}$-alcohols as copolymerized units. The alkoxylated alcohols can be characterized, for example, by means of the following formulae:

$$R-O-(EO)_n-(PO)_m-(BuO)_o-H \quad (I)$$

where $R=C_1$-$C_{30}$-alkyl, $EO = -CH_2-CH_2-O-$,

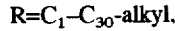

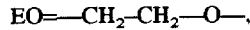

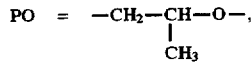

n, m, o=0 to 100, and the total of n+m+o is at least 3.

Examples of monomers of group (c) are the following compounds, where EO, PO and BuO have the meanings indicated in formula I:

$CH_3-O-(EO)_3-CH=CH_2$
$CH_3-O-(EO)_3-CH_2-CH=CH_2$
$CH_3-O-(EO)_6-CH=CH_2$
$CH_3-O-(EO)_6-CH_2-CH=CH_2$
$CH_3-O-(EO)_{11}-CH=CH_2$
$CH_3-O-(EO)_{11}-CH_2-CH=CH_2$
$CH_3-O-(EO)_{20}-CH=CH_2$
$CH_3-O-(EO)_{20}-CH_2-CH=CH_2$
$CH_3-O-(PO)_{10}-CH=CH_2$
$CH_3-O-(PO)_{10}-CH_2-CH=CH_2$
$CH_3-O-(BuO)_{10}-CH=CH_2$
$CH_3-O-(BuO)_{10}-CH_2-CH=CH_2$
$CH_3-O-(EO)_4-(PO)_2-CH=CH_2$
$CH_3-O-(BuO)_2-(EO)_7-CH_2-CH=CH_2$
$C_2H_5-O-(EO)_7-CH=CH_2$
$C_2H_5-O-(EO)_{10}-CH_2-CH=CH_2$
$C_{10}H_{23}-O-(EO)_3-CH_2-CH=CH_2$
$C_{10}H_{23}-O-(EO)_5-CH=CH_2$
$C_{10}H_{23}-O-(EO)_7-CH=CH_2$
$C_{10}H_{23}-O-(EO)_{11}-CH_2-CH=CH_2$
$C_{10}H_{23}-O-BuO-PO-(EO)_2-CH=CH_2$
$C_{13}H_{27}-O-(EO)_{15}-CH=CH_2$
$C_{13}H_{27}-O-(EO)_{20}-CH=CH_2$
$C_{13}H_{27}-O-(EO)_{30}-CH_2-CH=CH_2$
$C_{16}H_{33}-O-(EO)_{50}-CH=CH_2$
$C_{16}H_{33}-O-(EO)_{80}-CH_2-CH=CH_2$
$C_{18}H_{37}-O-(EO)_{50}-CH=CH_2$
$C_{18}H_{37}-O-(EO)_{50}-CH_2-CH=CH_2$
$C_4H_9-O-(PO)_{24}-(EO)_4-CH=CH_2$.

The alkoxylated alcohols which underlie the monomers (c) and which contain at least two different alkylene oxides as copolymerized units may contain the alkylene oxide units in the form of blocks or in random distribution. The monomers of group (c) which are preferably used are vinyl ethers of $C_1$-$C_{18}$-alkyl polyglycols.

The copolymers according to the invention are prepared by copolymerization of the monomers of groups (a), (b) and (c) in the presence of free-radical polymerization initiators. The copolymerization can moreover take place continuously or batchwise by all known processes of bulk, solution, precipitation, suspension and emulsion polymerization. Suitable free-radical polymerization initiators are all peroxides, hydroperoxides, azo compounds and redox catalysts conventionally used for this purpose. Examples which may be mentioned are acetyl cyclohexanesulfonyl peroxide, diacetyl peroxydicarbonate, dicyclohexyl peroxydicarbonate, di-2-ethylhexyl peroxydicarbonate, tert-butyl perneodecanoate, 2,2-azobis(4-methoxy-2,4-dimethylvaleronitrile), tert-butyl perpivalate, tert-butyl per-2-ethylhexanoate, tert-butyl permaleate, tert-butyl perisobutyrate, 2,2-azobis(isobutyronitrile), bis(tert-butylperoxy)cyclohexane, tert-butylperoxy isopropyl carbonate, tert-butyl peracetate, dicumyl peroxide, di-tert-amyl peroxide, di-tert-butyl peroxide, p-menthane hydroperoxide, cumene hydroperoxide, tert-butyl hydroperoxide, hydrogen peroxide, sodium peroxodisulfate, potassium peroxodisulfate, ammonium peroxodisulfate and peroxodisulfuric acid. It has in some cases proven useful to employ mixtures of initiators, in which case initiators which decompose at different temperatures are chosen. The polymerization initiators are used in the conventional amounts, ie. in amounts of from 0.1 to 20, preferably 0.2 to 15, % of the weight of the monomers. The decomposition of the peroxides and the azo compounds can be speeded up by carrying out the copolymerization in the presence of redox coinitiators such as benzoin, dimethylaniline, ascorbic acid and complexes, soluble in organic solvents, of heavy metals such as copper, cobalt, manganese, iron, nickel and chromium. The amounts of coinitiators normally employed are from 0.1 to 2000, preferably 0.1 to 1000, ppm. The initiators or initiator systems are preferably chosen so that their half-life at the polymerization temperature is less than 3 hours.

The copolymerization can be carried out, for example, in the temperature range from 40 to 200, preferably 80 to 150, °C. If the reaction mixture contains components whose boiling point is below the polymerization temperature, the copolymerization is carried out under pressure. Oxygen is excluded in all cases.

In order to prepare low molecular weight copolymers, it is often expedient to carry out the copolymerization in the presence of regulators. Examples of suitable regulators are allyl alcohol, 1-buten-3-ol, organic mercapto compounds such as 2-mercaptoethanol, 2-mercaptopropanol, mercaptobutanols, mercaptoacetic acid, mercaptopropionic acid, tert-butyl mercaptan, n-butyl mercaptan, n-octyl mercaptan, n-dodecyl mercaptan and tert-dodecyl mercaptan. If a regulator or a mixture of several regulators is employed in the copolymerization, the amounts used are from 0.1 to 10% of the weight of the monomers. The copolymerization can be carried out in conventional apparatus, eg. in stirred vessels which are equipped, for example, with an anchor, paddle, impeller or multistage impulse countercurrent agitator. Continuous preparation of the copolymers takes place in stirred vessel cascades, tubular reactors and static mixers. The simplest polymerization method is bulk polymerization. In this case, the monomers of groups (a) to (c) are polymerized in the presence of a polymerization initiator and in the absence of solvents and diluents. It is expedient to mix all the monomers in the required composition, introduce a small part of the mixture, eg. 5–10%, into the reactor, heat the mixture while stirring to the required polymerization temperature, and meter in the remaining monomer mixture and, separately therefrom, the initiator and, where appropriate, coinitiator and, where appropriate, regulator over the course of from 1 to 10, preferably 2 to 5, hours, continuously or at intervals. It may be expedient in this case to meter in the initiator and possibly also the coinitiator separately from the monomers in the form of a solution in a small amount of a suitable solvent. The copolymers can be isolated immediately or processed to aqueous solutions ready for use. If they are not directly soluble in water, they are partially or completely neutralized by addition of a base.

Another process for preparing the copolymers is solution polymerization. It is carried out in solvents in which the monomers and the resulting copolymers are soluble. Suitable for this purpose are all solvents which meet these conditions and do not react with the monomers under the polymerization conditions. Examples of suitable solvents are acetone, methyl ethyl ketone, diethyl ketone, methyl isobutyl ketone, ethyl acetate, butyl acetate, ethylene glycol dimethyl ether, diethylene glycol dimethyl ether, ethylene glycol diethyl ether, diethylene glycol diethyl ether, tetrahydrofuran and dioxane. In order to prepare low molecular weight copolymers, tetrahydrofuran or dioxane is preferably used as solvent because these solvents intervene as regulators in the polymerization. As described above for bulk polymerization, it is also expedient in this case to introduce the solvent and part of the monomer mixture (eg. about 5–20%) into a polymerization reactor and to meter in the remainder of the monomer mixture and the initiator and, where appropriate, coinitiator and regulator. The concentration of the monomers in the solution polymerization can vary within wide limits, eg. from 20 to 80% by weight. The concentration of the monomers in the solution employed for the polymerization is preferably from 30 to 70% by weight. The copolymer can easily be isolated from the solution after completion of the polymerization by evaporation of the solvent. The copolymers are soluble in water at least in the form of their alkali metal salts.

A preferred process for preparing the copolymers is precipitation polymerization. The solvents employed in this case are those in which the monomers are soluble and the resulting copolymers are insoluble and therefore precipitate. Examples of suitable solvents for precipitation polymerization are ethers such as diethyl ether, dipropyl ether, dibutyl ether, methyl tert-butyl ether, diethylene glycol dimethyl ether, toluene, xylene, ethylbenzene, cumene, aliphatic hydrocarbons and mixtures of said solvents. As known from the prior art described at the outset, it is expedient for precipitation polymerization processes to take place in the presence of a protective colloid in order to prevent at least substantially the formation of aggregates of polymer particles and deposition of the polymers on reactor wall and stirrer. Protective colloids which can be used are the substances described in the abovementioned references. They are very soluble in the solvents and do not react with the monomers. Suitable examples are copolymers of maleic anhydride with vinyl alkyl ethers and/or olefins with 4 to 20 carbon atoms and monoesters thereof with $C_{10}$–$C_{20}$-alcohols or mono- and diamides with $C_{10}$–$C_{20}$-alkylamines, and polyalkyl vinyl ethers whose alkyl group contains from 1 to 20 carbon atoms, such as polymethyl vinyl ether, polyethyl vinyl ether, polyisobutyl vinyl ether and polyoctadecyl vinyl ether. The protective colloids normally have K values of from 20 to 100 (determined by the method of H. Fikentscher in 1% by weight solution in cyclohexanone at 25° C.).

Protective colloids are normally used in the precipitation polymerization when the concentration of monomers in the solvent is more than 30% by weight. The amounts of protective colloid added are normally from 0.05 to 4% of the weight of the monomers. It may be advantageous in some cases to combine several protective colloids. For example, it is expedient in precipitation polymerization to introduce the solvent, protective colloid and part of the monomer mixture into the reactor and to meter in at the chosen polymerization temperature, while stirring vigorously, the remainder of the monomer mixture and initiator and, where appropriate, coinitiator and regulator. The feed times for the monomer mixture and initiator are, in general, from 1 to 10, preferably 2 to 5, hours. However, it is also possible to polymerize all the starting materials together in one reactor, but in this case problems may arise with the dissipation of heat. The concentrations of the monomers to be polymerized in the solvent are, for example, from 10 to 80, preferably 30 to 70, % by weight. After completion of the polymerization, the polymers can be immediately isolated and freed of adherent solvent in evaporators, belt driers, paddle driers, spray driers or fluidized bed driers. It is then possible to prepare aqueous solutions from the copolymer powders or aqueous solutions of the salts of the copolymers by neutralization. A preferred method for preparing the aqueous salt solution of the copolymers comprises initially adding water to the polymer suspension resulting from the polymerization and then removing the solvent by steam distillation. The neutralization then takes place by adding a base. Bases suitable for the neutralization have already been mentioned above. Suitable and preferred for the partial or complete neutralization of the copolymers are sodium hydroxide, potassium hydroxide, magnesium hydroxide, ammonia, ethanolamine, diethanolamine and triethanolamine. The copolymers are soluble in water at least in the salt form. The aqueous solutions are brown to colorless and clear.

The copolymers have K values of at least 8 (determined by the method of H. Fikentscher on 1% by weight aqueous solutions of the sodium salts of the copolymers at 25° C. and pH 7.5). The K values of the copolymers can be up to about 300. Preferred water-soluble copolymers are those which comprise (a) 40–75 mol % of maleic acid, maleic anhydride, acrylic acid and/or methacrylic acid, (b) 15–49 mol % of isobutene, diisobutene, methyl vinyl ether, styrene and/or vinyl acetate and (c) 0.1–15 mol % of vinyl ethers of $C_1$–$C_{18}$-alcohols onto which from 3 to 20 mol of ethylene oxide and/or propylene oxide have been added, as copolymerized units and have K values of from 10 to 100.

The copolymers can be used in various sectors, eg. as dispersants for producing plastic, wax or oil dispersions or as dispersants for pigments for producing highly concentrated aqueous pigment suspensions. The copolymers can be used, depending on their composition, as dispersants for oil-in-water dispersions or as dispersants for water-in-oil dispersions. The copolymers are preferably used as scale inhibitors. They prevent the deposition of scale and the separation out of water hardness in water-conveying systems. The mode of action of the copolymers according to the invention as scale inhibitors comprises, in particular, the prevention of the formation of firmly adherent precipitates of the hardness salts such as calcium carbonate, magnesium oxide, magnesium carbonate, calcium, barium or strontium sulfate, calcium phosphate and similar alkaline earth metal salts of low solubility. Addition of the copolymers in the substoichiometric dosage range influences the formation of deposits in such a way that no hard and rock-like deposits are produced, on the contrary there is formation of deposits which are finely divided in water and can easily be suspended. In this way, the surfaces of, for example, heat exchangers, pipes or pump components are kept free of deposits, and their tendency to corrosion is greatly reduced. In particular, the risk of crevice corrosion is reduced thereby. Furthermore, the growth of microorganisms on these metal surfaces is impeded. The scale inhibitors are able to increase the useful lives of such systems and considerably reduce stoppage times for cleaning systems components. Water-conveying systems to which a scale inhibitor is added comprise, for example, open or closed cooling circulations, for example of power stations or chemical facilities such as reactors, stills or similar components where heat must be dissipated. Scale inhibitors can also be employed in boiler waters and steam generators. A preferred application of the scale inhibitors to be used according to the invention is the desalination of seawater by distillation or by means of membrane processes such as reverse osmosis or electrodialysis. Thus, for example, in the multistage flash evaporation distillation process for seawater desalination, concentrated seawater is circulated at elevated temperature. In this case, the scale inhibitors effectively suppress the separation out of hardness components such as brucite and the caking thereof onto components of the system. The amounts of copolymer required for scale inhibition are, for example, from 0.1 to 100 ppm copolymer based on the aqueous medium. Copolymers preferably used as scale inhibitors have a K value of from 10 to 50 (determined by the method of H. Fikentscher on 1% by weight aqueous solutions of the sodium salts at 25° C. and pH 7.5).

The copolymers can also be used as scale inhibitors in the evaporation of juices from cane or beet sugar. As is known, calcium hydroxide, carbon dioxide, sulfur dioxide and, where appropriate, phosphoric acid are added to the sugar thin juice for purification. Calcium salts of low solubility, such as calcium carbonate, calcium sulfate or calcium phosphate, remain after filtration of the sugar juice treated in this way. These salts then precipitate during the evaporation process and may form rock-like deposits on heat exchanger surfaces. Rock-like deposits of concomitant substances such as silica or calcium salts of organic acids such as oxalic acid are also produced. The copolymers to be used according to the invention also act as scale inhibitors on addition to sugar thin juice and prevent the formation of rock-like deposits in the equipment where the sugar thin juice is evaporated.

The copolymers can also be used as incrustation inhibitors and antiredeposition agents in amounts of from 0.5 to 10% by weight in detergent formulations. The copolymers are normally used in the form of dilute aqueous solutions. The particular advantage of the copolymers according to the invention compared with known copolymers is that no turbidity occurs on dilution of the aqueous copolymer solutions with seawater, so that such solutions can be metered without difficulties. Compared with known copolymers, the copolymers according to the invention have the additional advantage that there is a great reduction in the foam formation on evaporation of seawater.

The K values of the copolymers were determined by the method of H. Fikentscher, Cellulose-Chemie, 13 (1932) 48–64 and 71–74 in 1% aqueous solution of the sodium salts of the copolymers at 25° C. and pH 7.5. The percentage data mean percent by weight.

EXAMPLES 1 TO 10

Preparation of copolymers 2700 g of the solvent indicated in each case in Table 1, and 6 g of 2-mercaptoethanol in each of Examples 1 and 2 are introduced into a heatable pressure reactor equipped with a stirrer and feed devices and are heated to the temperature indicated in each case in Table 1. As soon as this temperature is reached, there is addition at a constant rate of monomers (a), (b) and (c) indicated in each case in Table 1, in 300 g of the solvent which is likewise indicated in Table 1, over the course of 4 hours and, separately therefrom, of a solution of 6 g of tert-butyl perpivalate in 100 g of the solvent used in each case over the course of 5 hours. After addition of the initiator is complete, the reaction mixture is stirred at the temperature stated in the Table for 2 hours and then cooled, and 300 g of water are added. The solvent is removed by passing steam in, and the pH is adjusted to 7.5 by adding 50% strength aqueous sodium hydroxide solution. The 40% strength aqueous polymer solutions obtainable in this way are almost colorless (Example 6), yellowish (Examples 4, 5 and 9) or brownish (Examples 1, 2, 3, 7, 8 and 10). The aqueous solutions are in all cases clear.

TABLE 1

| Ex. | Monomers [g] | | | Solvent | Temp. [°C.] | K value |
|---|---|---|---|---|---|---|
| | a) | b | c) | | | |
| 1 | 210.9 g MA | 55.6 g Isobutene | 33.4 g $CH_3(C_2H_4O)_3$—O—CH=$CH_2$ | Toluene | 100 | 19.8 |
| 2 | 209.8 g MA | 55.3 g Isobutene | 34.9 g $CH_3$—$(C_2H_4O)_3$—O—$CH_2$—CH=$CH_2$ | Toluene | 100 | 17.4 |
| 3 | 183.8 g MA | 30 g Isobutene | 86.2 g $CH_3$—$(C_2H_4O)_6$—O—CH=$CH_2$ | o-Xylene | 120 | 22.5 |
| 4 | 177.1 g MA | 58.7 g Isobutene | 122 g $CH_3$—$(C_2H_4O)_6$—O—$CH_2$—CH=$CH_2$ | o-Xylene | 120 | 26.5 |
| 5 | 164.5 g MA | 42.8 g Isobutene | 92.7 g $CH_3$—$(C_2H_4O)_{15}$—O—CH=$CH_2$ | Ethylbenzene | 120 | 18.3 |
| 6 | 225 g MA | 53.3 g Isobutene | 21.7 g $C_{10}H_{21}$—$(C_2H_4O)_3$—O—CH=$CH_2$ | Toluene | 90 | 43.5 |
| 7 | 141.6 g MA | 111.8 g Vinyl acetate | 46.6 g $CH_3$—$(C_2H_4O)_6$—O—CH=$CH_2$ | o-Xylene | 120 | 18.7 |
| 8 | 185.9 g MA | 70.5 g Styrene | 43.6 g $CH_3$—$(C_2H_4O)_6$—O—CH=$CH_2$ | o-Xylene | 120 | 20.5 |

TABLE 1-continued

| | Monomers [g] | | | | Temp. | |
|---|---|---|---|---|---|---|
| Ex. | a) | b | c) | Solvent | [°C.] | K value |
| 9 | 161.2 g MA | 85.8 g Methyl vinyl ether | 53 g $CH_3—(C_2H_4O)_6—O—CH=CH_2$ | Toluene | 90 | 32.5 |
| 10 | 152 g MA 45 g AA | 53 g Isobutene | 50 g $CH_3—(C_2H_4O)_6—O—CH=CH_2$ | o-Xylene | 120 | 19.6 |

MA: Maleic anhydride
AA: Acrylic acid

In order to determine the use properties of the copolymers, their behavior in seawater desalination, on dilution with 2% strength aqueous sodium chloride solution and in foam formation on passing air through is assessed. The following test methods were used for this:

Scale inhibition in seawater desalination

In this test, the copolymers are investigated as inhibitor in the formation of calcium and magnesium hydroxides and carbonates from synthetic seawater solution. During seawater desalination, in particular calcium carbonate and magnesium hydroxide form firmly adherent and interfering deposits on the heat exchanger surfaces. The formation of barium sulfate is also a problem which must be taken seriously in this connection. The test solution comprises an aqueous salt solution which contains 70° German hardness of $Mg^{2+}$ 14° German hardness of $Ca^{2+}$ 70° German hardness of $CO_3^{2-}$.

The synthetic seawater solution is then mixed in each case with 25 ppm of the copolymers described in Examples 1 to 10 and pumped for 3 hours through a dynamic circulation apparatus. After the test has lasted 3 hours, samples are taken and analyzed by titrimetry for the content of water hardness. The deposits forming in the heat exchanger can be calculated from the decrease in water hardness during the test. A smaller degree of hardness in the removed water sample means more deposits on the heat exchanger pipes. The water hardnesses found are listed in Table 2. A high degree of hardness after 3 hours of the test indicates good scale inhibition.

Salt stability in solution

In order to test the salt stability of the 40% strength aqueous copolymer solutions obtained as in Examples 1 to 10, the solutions are each diluted to a copolymer content of 10% by adding 2% strength sodium chloride solution. After storage in a heat cabinet for 24 hours, the appearance of the diluted solution is assessed. The results are shown in Table 2.

Determination of foam formation

The 40% strength aqueous copolymer solutions indicated in Table 1 are each diluted to a copolymer content of 10% by weight with distilled water. 200 ml of the diluted solution are then introduced into a foam tube with a capacity of 1500 ml. 13.5 l of air per hour are passed into the foam tube from below through a sintered disk. 5 minutes after starting to pass air in, the height of the foam above the liquid level is measured. The results of measurement are indicated in Table 2 and are compared therein with the results of measurement for Comparative Examples 1 to 5.

COMPARATIVE EXAMPLE 1

A hydrolyzed homopolymer of maleic acid was prepared as disclosed in GB-A-1 411 063, Example 1, by polymerizing maleic anhydride in xylene with di-tert-butyl peroxide as catalyst at 130° C.

COMPARATIVE EXAMPLE 2

A hydrolyzed homopolymer of maleic anhydride was prepared as disclosed in EP-A-0 261 589, Example 6, by polymerizing maleic anhydride in xylene with tert-butyl per-2-ethylhexanoate at the boiling point of the xylene.

COMPARATIVE EXAMPLE 3

A terpolymer of maleic anhydride, vinyl acetate and ethyl acrylate in the molar ratio 9:2:1 was tested as scale inhibitor as disclosed in Example 14 of GB-A-1 454 657.

COMPARATIVE EXAMPLE 4

The copolymer of maleic anhydride and hydroxypropyl acrylate described in Example 1 of EP-A-0 276 464 was tested as scale inhibitor.

COMPARATIVE EXAMPLE 5

The test solution described above was investigated without any other additive.

TABLE 2

| | | Scale inhibition - water hardness | | Salt solution | Foam height av. of 3 measurements |
|---|---|---|---|---|---|
| Ex. | Comp. Ex. | Start | after 3 h | after 24 h | in mm |
| 11 | — | 84 | 65 | clear | 10 |
| 12 | — | 84 | 69 | clear | 10 |
| 13 | — | 84 | 63 | clear | 0 |
| 14 | — | 84 | 68 | clear | 10 |
| 15 | — | 84 | 62 | clear | 0 |
| 16 | — | 84 | 66 | clear | 15 |
| 17 | — | 84 | 60 | clear | 35 |
| 18 | — | 84 | 63 | clear | 40 |
| 19 | — | 84 | 59 | clear | 10 |
| 20 | — | 84 | 70 | clear | 5 |
| | 1 | 84 | 49 | insoluble portions | 55 |
| | 2 | 84 | 50 | insoluble portions | 50 |
| | 3 | 84 | 55 | clear | 45 |
| | 4 | 84 | 52 | clear | 30 |
| | 5 | 84 | 42 | — | — |

We claim:

1. A method of scale inhibition comprising:
   adding to a system in need thereof, a copolymer which is obtained by copolymerizing
   (a) 30 to 80 mol % of monoethylenically unsaturated $C_3$–$C_8$-carboxylic acids, their anhydrides and/or their water-soluble salts,
   (b) 10 to 50 mol % of $C_2$–$C_8$-olefins, styrene, alkylstyrenes, $C_1$–$C_{10}$-alkyl vinyl ethers and/or vinyl esters of saturated $C_1$–$C_{10}$-monocarboxylic acids and (c) 0.01 to 20 mol % of vinyl ethers of alkoxylated $C_1$–$C_{30}$-alcohols in the presence of free radical polymerization initiators.

2. The method of claim 1, wherein said vinyl ethers of alkoxylated $C_1$–$C_{30}$-alcohols is of the formula $$R-O-AO-CH=CH_2,$$

wherein R=$C_{1-30}$ alkyl and AO are alkoxylation units.

3. The method of claim 1, wherein said vinyl ethers of alkoxylated $C_1$–$C_{30}$-alcohol is of the formula $$R-O-(EO)_n-(PO)_m-(BuO)_o-CH=CH_2$$

wherein
R=$C_{1-30}$ alkyl,
EO=$CH_2-CH_2-O-$;

$$PO = -CH_2-CH(CH_3)-O-,$$

$$BO = -CH_2-CH(C_2H_5)-O-,\ -CH(CH_3)-CH(CH_3)-O-\ \text{and/or}$$

$$-C(CH_3)_2-CH_2-O-,$$

n, m, o=0 to 100, and the total of n+m+o is at least 3.

4. The method of claim 1, wherein said vinyl ether of alkoxylated $C_1$–$C_{30}$-alcohol is selected from the group consisting of the formula $CH_3-O-(EO)_3-CH=CH_2$,
$CH_3-O-(EO)_6-CH=CH_2$,
$CH_3-O-(EO)_{11}-CH=CH_2$,
$CH_3-O-(EO)_{20}-CH=CH_2$,
$CH_3-O-(PO)_{10}-CH=CH_2$,
$CH_3-O-(BuO)_{10}-CH=CH_2$,
$CH_3-O-(EO)_4-(PO)_2-CH=CH_2$,
$C_2H_5-O-(EO)_7-CH=CH_2$,
$C_{10}H_{23}-O-(EO)_5-CH=CH_2$,
$C_{10}H_{23}-O-(EO)_7-CH=CH_2$,
$C_{10}H_{23}-O-BuO-PO-(EO)_2-CH=CH_2$,
$C_{13}H_{27}-O-(EO)_{15}-CH=CH_2$,
$C_{13}H_{27}-O-(EO)_{20}-CH=CH_2$,
$C_{16}H_{33}-O-(EO)_{50}-CH=CH_2$,
$C_{18}H_{37}-O-(EO)_{50}-CH=CH_2$,
$C_4H_9-O-(PO)_{24}-(EO)_4-CH=CH_2$.

and a mixture thereof.

* * * * *